United States Patent
Bisso et al.

(10) Patent No.: US 9,245,124 B2
(45) Date of Patent: *Jan. 26, 2016

(54) APPLICATION SELECTION USING CURRENT DETECTION INTELLIGENCE

(71) Applicant: MICROSOFT CORPORATION, Redmond, WA (US)

(72) Inventors: Robert Peter Bisso, Saint James, NY (US); Edward William Schaefer, Lake Ronkonkoma, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/297,413

(22) Filed: Jun. 5, 2014

(65) Prior Publication Data

US 2014/0289849 A1  Sep. 25, 2014

Related U.S. Application Data

(63) Continuation of application No. 12/870,582, filed on Aug. 27, 2010, now Pat. No. 8,776,219.

(51) Int. Cl.
*G06F 21/00* (2013.01)
*G06F 21/57* (2013.01)
*G06F 21/56* (2013.01)
*G06Q 30/02* (2012.01)
*G06F 15/173* (2006.01)

(52) U.S. Cl.
CPC .............. *G06F 21/57* (2013.01); *G06F 21/56* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 7,103,564 B1 | 9/2006 | Ehnebuske | |
| 7,483,961 B2 | 1/2009 | Affaki | |
| 7,681,134 B1 | 3/2010 | Grechishkin et al. | |
| 7,878,390 B1 * | 2/2011 | Batten | G06Q 30/02 235/383 |
| 8,239,941 B1 | 8/2012 | Lymer et al. | |

(Continued)

FOREIGN PATENT DOCUMENTS

CN  1736080  2/2006

OTHER PUBLICATIONS

Moskovich, "Detection of Unknown Computer Worms Activity Based on Computer Behavior using Data Mining", Published Oct. 2006.

(Continued)

*Primary Examiner* — Farid Homayounmehr
*Assistant Examiner* — Maung Lwin
(74) *Attorney, Agent, or Firm* — Joann Dewey; Sade Fashokun; Micky Minhas

(57) ABSTRACT

Selecting one or more applications from the plurality of similar or near redundant applications to activate. A method includes retrieving information about current characteristics of one or more applications. The method further includes retrieving information about a current computing operational landscape. Based on the information about current characteristics of one or more applications and the information about a current computing operational landscape, the method further includes creating a ranking of applications. The rankings are made available to a system with a plurality of applications with similar or near redundant functionality. At the system, one or more of the applications in the plurality of applications are selected to activate based on the ranking of applications.

20 Claims, 5 Drawing Sheets

(56) References Cited

U.S. PATENT DOCUMENTS

| | | | |
|---|---|---|---|
| 8,955,109 B1* | 2/2015 | Satish | G06F 11/00 726/22 |
| 2004/0194153 A1 | 9/2004 | Garg et al. | |
| 2005/0245246 A1* | 11/2005 | Munch et al. | 455/418 |
| 2005/0256820 A1* | 11/2005 | Dugan | G06N 7/02 706/52 |
| 2006/0004764 A1* | 1/2006 | Kurhekar et al. | 707/10 |
| 2006/0010217 A1* | 1/2006 | Sood | 709/206 |
| 2006/0112179 A1 | 5/2006 | Baumeister et al. | |
| 2006/0294595 A1 | 12/2006 | Drihem | |
| 2007/0067180 A1* | 3/2007 | James | G06Q 30/02 705/306 |
| 2007/0240218 A1 | 10/2007 | Tuvell | |
| 2007/0271269 A1 | 11/2007 | Chen et al. | |
| 2007/0282670 A1* | 12/2007 | Repasi | G06Q 30/0278 705/306 |
| 2008/0066078 A1* | 3/2008 | Rathod et al. | 719/311 |
| 2008/0243964 A1* | 10/2008 | Baker et al. | 707/205 |
| 2008/0244691 A1 | 10/2008 | Hilerio | |
| 2008/0263024 A1 | 10/2008 | Landschaft et al. | |
| 2009/0016510 A1 | 1/2009 | Becker | |
| 2009/0043596 A1* | 2/2009 | Pierce | G06Q 30/02 705/346 |
| 2009/0055896 A1 | 2/2009 | Aoki et al. | |
| 2009/0063371 A1 | 3/2009 | Lin | |
| 2009/0217352 A1* | 8/2009 | Shen et al. | 726/3 |
| 2010/0005291 A1 | 1/2010 | Hulten et al. | |
| 2010/0016011 A1* | 1/2010 | Alen | G06Q 30/02 455/550.1 |
| 2010/0162346 A1 | 6/2010 | Holostov et al. | |
| 2010/0212010 A1 | 8/2010 | Stringer | |
| 2010/0250337 A1 | 9/2010 | Kassael | |
| 2011/0010366 A1 | 1/2011 | Varshavsky et al. | |
| 2011/0320307 A1* | 12/2011 | Mehta | G06Q 30/0282 705/26.7 |
| 2012/0054857 A1 | 3/2012 | Bisso et al. | |
| 2012/0084859 A1 | 4/2012 | Radinsky et al. | |

OTHER PUBLICATIONS

Author Unknown, "Maximizing Messaging Security with Forefront Security for Exchange Server and Exchange Hosted Filtering", Available at least as early as Jul. 2010.

Author Unknown, "IronPort Virus Defense", Published Jun. 2008, Available at <<http://www.ironport.com/technology/ironport_virus_defense.html>>.

Rajpal, "Protect E-Mail with forefront Security", Available at least as early as Jul. 2010, Available at <<http://technet.microsoft.com/en-.

Alexandru Chirita, "MailRank: Using Ranking for Spam Detection", Available at least as early as Jul. 2010.

Author Unknown, "Why one anti-virus engine is not enough", Published Apr. 2007.

Boja Catalin, et al., "Characteristics for Software Optimization Projects", Academy of Economic Studies, Bucharest, Jan. 2008, pp. 46-51.

U.S. Appl. No. 12/870,582, Jul. 19, 2012, Office Action.
U.S. Appl. No. 12/870,582, Nov. 23, 2012, Office Action.
U.S. Appl. No. 12/870,582, May 23, 2012, Office Action.
U.S. Appl. No. 12/870,582, Nov. 12, 2013, Office Action.
U.S. Appl. No. 12/870,582, Apr. 8, 2014, Notice of Allowance.
"First Office Action Issued in Chinese Patent Application No. 201110257275.X", Mailed Date: Apr. 27, 2015, 12 Pages.
"Second Office Action and Search Report Issued in Chinese Application No. 201110257275.X", Mailed Date: Oct. 23, 2015, 12 Pages.

* cited by examiner

APPLICATION SELECTION USING CURRENT DETECTION INTELLIGENCE

CROSS-REFERENCE TO RELATED APPLICATIONS

This application is a continuation of U.S. patent application Ser. No. 12/870,582 filed on Aug. 27, 2010, entitled "APPLICATION SELECTION USING CURRENT DETECTION INTELLIGENCE," which issued as U.S. Pat. No. on 8,776,219 on Jul. 8, 2014, and which application is expressly incorporated herein by reference in its entirety.

BACKGROUND

1. Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Networking computer systems is not without risk. In particular, the risk of becoming infected with malware is increased with increases in the number of computer systems that are networked and the increases in speed and functionality of computer networks. In particular Trojan horses and viruses are prevalent and widespread. Such malware may be designed to conscript computer resources for nefarious activities such as sending spam email or generating denial of service attacks. Other malware may be designed to openly or surreptitiously cause damage to a particular user or system. For example, some malware is designed to erase files, generate taunting messages, disable all or part of a computer system, etc. Other malware may secretly steal information through the use of key loggers or software that examines and steals data from data files. Still other malware may "hold hostage" a computer system by disabling the system until some sort of ransom is paid.

To combat malware, a variety of both free and paid anti-malware software and services have emerged. These software applications and services detect malware based on "signatures" of the malware. In particular, malware may be packaged in files of a particular name and/or size, may cause certain registry entries to be made into a system registry, may cause damage to particular files in a particular way, etc. To evade detection, malware is often configured to morph such that the signatures change. This causes the anti-malware software and service providers to update their products with the new signatures or ways to detect the signature changes. This is a repeating process which results in some providers' anti-malware products being more up-to-date for certain malware than others. However, because of the constant changes, the large number of anti-malware providers, and the vast number of viruses existing in the wild, different providers may be better at detecting different viruses. Thus selecting a single anti-malware provider may result in excellent protection for one family or even one strain of malware while compromising protection for another. Additionally, over time, another anti-malware provider may provide even better or more up to date protection for the one family or strain.

The capabilities of a particular provider's Anti-malware engine to detect the currently circulating malware changes over time as new malware or variants of current malware emerge. Using multiple providers' anti-malware engines help combat this, but affects the performance of malware detection if all engines are used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment including a system with a plurality of applications with similar or near redundant functionality. The method includes acts for selecting one or more applications from the plurality of applications to activate. The method includes retrieving information about current characteristics of one or more applications. The method further includes retrieving information about a current computing operational effectiveness landscape. Based on the information about current characteristics of one or more applications and the information about a current computing operational landscape, the method further includes creating a ranking of applications. The rankings are sent to a system with a plurality of applications with similar or near redundant functionality. At the system, one or more of the applications in the plurality of applications are selected to activate based on the ranking of applications.

Another embodiment includes a method that may be practiced in a computing environment including a system with a plurality of applications with similar or near redundant functionality. The method includes acts for selecting one or more applications from the plurality of application to activate. The method includes: at a system with a plurality of applications with similar or near redundant functionality, retrieving information from an information source. The information includes a ranking of applications. The applications are ranked based on a current computing operational effectiveness landscape. Based on the ranking of applications, the method includes selecting one or more applications in the plurality of applications. The selected applications are activated while other applications in the plurality of applications remain inactive.

Another embodiment includes a method that may be practiced in a computing environment including a system with a plurality of applications with similar or near redundant functionality. The method includes acts for selecting one or more applications from the plurality of applications to activate. The method includes retrieving information about current characteristics of one or more applications. The method further includes retrieving information about a current computing operational landscape. Based on the information about current characteristics of one or more applications and the information about a current computing operational effectiveness landscape, the method further includes selecting one or more applications in the plurality of applications. The selected applications are activated while other applications in the plurality of applications remain inactive.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
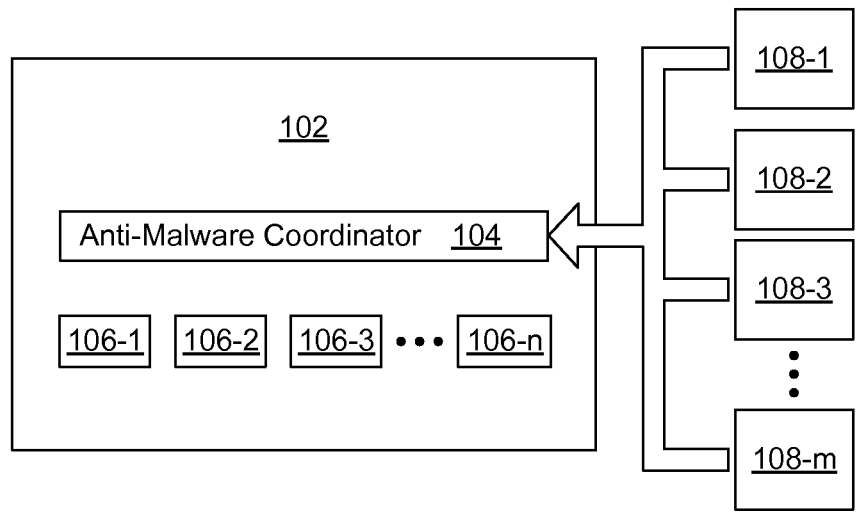
FIG. 1A illustrates a user system with a plurality of similar or near redundant applications, such as anti-malware engines, coordinated by a coordinator.

Using multiple providers' anti-malware engines can help to provide better anti-malware protection, but affects the performance of malware detection if all engines are used. Choosing a subset of anti-malware engines can help in finding a balance between performance and detection capabilities. Embodiments described herein illustrate how to select a subset of engines to address both the currently circulating malware and a particular malware during the period of a malware outbreak. As will be discussed in more detail below after the discussion of malware centric embodiments, embodiments herein may alternatively directed to other applications where multiple applications with similar or near redundant functionality are available at a system. For example, embodiments may be directed to selection of anti-spam applications, URL filter applications, etc. Embodiments may be directed to applications where multiple applications with similar functionality or near redundant functionality are installed or located on a system. For example, a system may have multiple web browsers. One browser may be less safe to run at a given time than some other browser. Data can be downloaded about browser threat landscape along with browsers effectiveness in overcoming threat. When a user requests a browser, the browser with least threat could be opened. Embodiments may be applied to other applications as well, though not specifically enumerated here.

Returning once again to malware centric embodiments, there are a variety of sources, both public and proprietary, that provide information on the most active malware in the wild at any given time. For example, http://www.virusbtn.com or http://www.avtest.org can provide such information. This information includes data about both outbreaks and common malware at any given time or over a time period. These sources also provide data on how well anti-malware engines perform against this data. The sources of data can be queried to collect and used to rank anti-malware engines for their overall effectiveness at a given point in time. This ranking can then be distributed to products that employ a multiple anti-malware engine strategy to provide the best set of protection engines.

Embodiments described herein may include one or more features to facilitate the unique functionality of the embodiments herein. For example, some embodiments may include the ability to provide current detection intelligence to improve the detection capabilities of a product using multiple anti-malware engines. Some embodiments may provide an ordered list of the best antimalware engines during a period when a malware outbreak is not prevalent. Some embodiments may provide an ordered list of the best antimalware engines during a period when a malware outbreak is prevalent. Some embodiments may improve performance by employing a subset of the most effective engines instead of relying on using all available engines. Embodiments may include functionality to reduce the burden of needing to know which engines to select at any given time.

In one embodiment, information feeds and websites that provide information and data on the current detection capabilities of various anti-malware engines and current malware outbreaks are monitored. This information is analyzed to determine a subset of anti-malware from the selection of provider anti-malware engines in the malware detection product. This information is then packaged into an update that the malware detection product downloads, similar to regular anti-malware engine signature updates, and uses this information to determine the best subset of engines at the current time.

Embodiments are now illustrated with reference to the Figures. Reference is now made to FIG. 1A. FIG. 1A illustrates a user system 102. The user system may be a system that typically employs anti-malware products such as anti-spyware, antivirus, etc. Such a system may be, as examples, a general purpose computer system, such as a server, typical desktop or laptop computer running commercially available operating system and/or software or a special purpose computer with proprietary operating system(s) and/or software or anything in between. However, the system is modified to include a number of modules to perform engine selection capabilities.

The user system 102 includes anti-malware coordinator 104. The anti-malware coordinator may be a software and/or hardware module that coordinates anti-malware application, such as the anti-malware engines 106-1, 106-2, 106-3, and 106-n (which may be referred to herein generally as 106). The user system 102 may include a number of anti-malware engines 106 with similar or near redundant functionality. For example, the user system may include (but are not restricted to) the malware engines Microsoft™ Malware protection Center available from Microsoft™ Corporation of Redmond Wash., Kaspersky Anti-Virus available from Kaspersky Lab ZAO of Moscow, Russian Federation, Norman Anti-Virus available from Norman ASA of Lysaker, Norway, Command Antivirus available from Authentium in Palm Beach Gardens, Fla., and VirusBuser available from VirusBuster of Budapest, Hungary. The anti-malware coordinator 104 can select which anti-malware engines 106 to run or enable based on information processed at the anti-malware coordinator 104. For example, information may be received at the anti-malware coordinator 104 which includes information from information feeds and websites that provide information and data on the current detection capabilities of various anti-malware engines 104 and current malware outbreaks are monitored. This information is analyzed at the anti-malware coordinator 104 to determine a subset of anti-malware engines 106 from the selection of provider anti-malware engines available on the system 102.

As noted, information may be received from information feeds and websites that provide information and data on the current detection capabilities of various anti-malware engines 104 and where current malware outbreaks are monitored. FIG. 1A illustrates information sources 108-1, 108-2, 108-3, and 108-$m$ (which may be referred to herein generally as 108). These information sources 108 represent information feeds, websites, databases, ftp sites, services, etc that provide information and data on the current detection capabilities of various anti-malware engines 104 and/or information on current malware outbreaks.

FIG. 1A illustrates that anti-malware engines 106 are at the user system 102. These anti-malware engines 106 may be in any one of a number of different states depending on the configuration of the embodiment. For example, anti-malware engines may be in an installed state, an uninstalled state, a dormant state, and/or an active state. For example, an engine 106 in an installed state may be implemented as modules on a mass storage device where one or more of the modules are registered with a system registry. An installed engine 106 may be in an active or passive state as described below. An un-installed engine may have code for the engine 106 stored on a mass storage device, but may not have code modules registered with the system registry. Rather, the un-installed engine may simply stored as an installer package, compressed files, set of install files, etc. waiting to be formally installed and registered with the system 102.

Installed engines 106 may be in a dormant state or an active state. In a dormant state, the installed engine may be either partially or fully disabled. The engine may not be running any anti-malware functionality, not loaded into memory for execution, only partially loaded into memory, or otherwise be limited in resource use. In an active state, the engine 106 may be actively engaged in one or more of searching for malware, monitoring incoming data for malware signatures, or cleaning infected files or storage devices, etc. In some embodiments, in an active state, a system may engage the engine. A coordinator application, such as the anti-malware coordinator 104, loads the engines 106 into memory and can accept data streams from various sources. Embodiments then use the engine to scan the data stream. In an active state, an engine 106 is likely using a comparatively increased amount of memory and processing resources.

The anti-malware coordinator 104 includes functionality for changing the state of anti-malware engines 106. For example, the anti-malware coordinator 104 can install or un-install anti-malware engines 106. Additionally or alternatively the anti-malware coordinator 104 can cause anti-malware engines 106 to be active or dormant. Additionally or alternatively, the anti-malware coordinator 104 can coordinate resource usage of active anti-malware engines 106. For example, the anti-malware coordinator 104 can schedule system scans for different anti-malware engines 106 at different times to reduce the amount of resources (e.g. processor and memory resources) used for anti-malware activities as a given time.

Figure 1B:
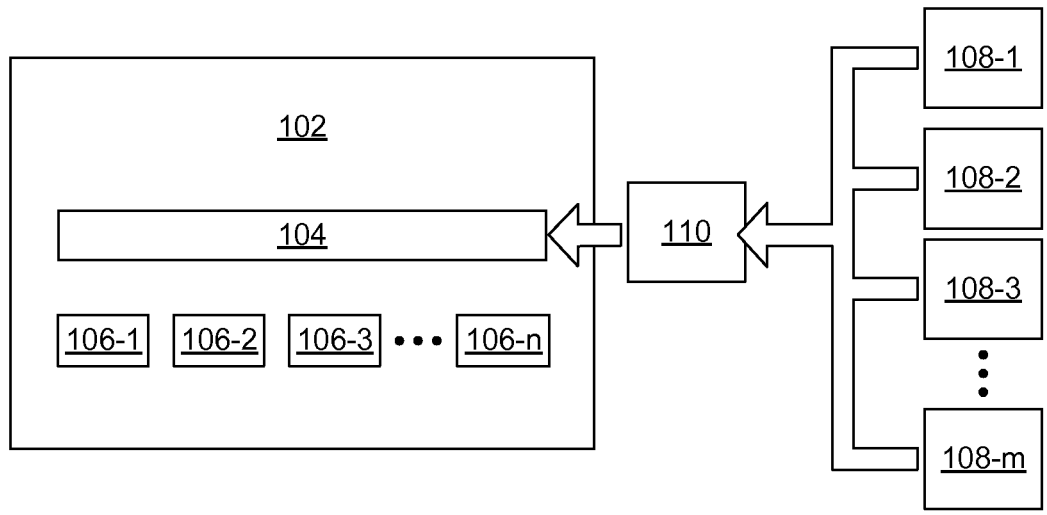
FIG. 1B illustrates another example of a user system with a plurality of similar or near redundant applications, such as anti-malware engines, coordinated by a coordinator.

Various alternative embodiments can be implemented. For example, FIG. 1B illustrates an alternative embodiment where an information coordinator service 110 external to the user system 102 is used. The information coordinator service 110 receives information from information sources 108-1, 108-2, 108-3, and 108-$m$ with information and data on the current detection capabilities of various anti-malware engines 104 and/or information on current malware outbreaks. This information is analyzed at the information coordinator service 110 to determine a subset of anti-malware from the selection of provider anti-malware engines. This information is then packaged into an update that a malware detection product at the user system 102 downloads, where the system 102 uses this information in the determination of the best subset of engines at the current time. For example, the anti-malware coordinator 104 may receive information from the information coordinator service 110 which may be used to determine which anti-malware engines 106 should be active. A user system 102 may provide information to the information coordinator service 110 about which engines 106 are available (installed or installable) at the user system 102, which may then alter what information the information coordinator service 110 provides to the user system 102. In some embodiments, the information coordinator system may make recommendations to the user system 102 to obtain other engines 106 and/or may provide code for other engines 106 not available at the user system 102.

Figure 1C:
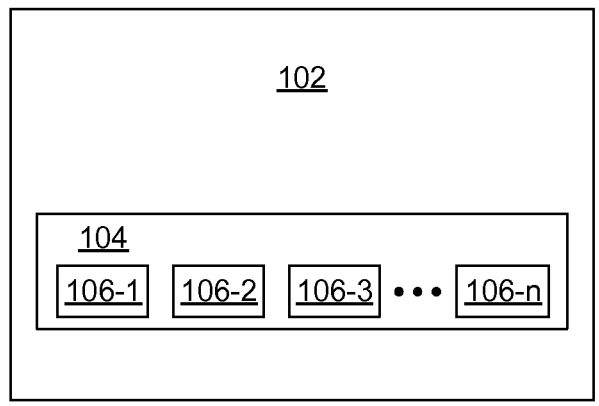
FIG. 1C illustrates another example of a user system with a plurality of similar or near redundant applications, such as anti-malware engines, coordinated by a coordinator.

FIG. 1C illustrates yet another alternative embodiment. FIG. 1C illustrates an example where the anti-malware coordinator 104 plays a more active role in user interface elements of the user system 102 while the anti-malware engines 106, though functional, are more transparent. For example, embodiments may be implemented where, from a user perspective, it would appear that a single anti-malware product is in use: that displayed to the user by the anti-malware coordinator 104. The engines 106 are used for detection, quarantine, cleansing, etc., but reporting functionalities reporting actions to a user are provided by the anti-malware coordinator. The anti-malware coordinator may automatically download updates, engines, etc. In some embodiments, the anti-malware coordinator may also be used to aggregate the results returned by the engines and take an action that is defined by a default or user modifiable configuration data. This allows the user to treat the engines as one and take action based on weighing results from the engines. Quarantining is an example of this, so in some embodiments, the anti-malware coordinator may implement a single quarantine for the application instead of multiple quarantines defined by each engine. Embodiments may make decisions to clean or delete a virus by the specific engine that identified the threat. In some embodiments, the anti-malware coordinator may provide branding for user interfaces. Thus, embodiments may be implemented where a single common user interface is displayed irrespective of what applications are selected and activated.

While the examples illustrated above have been described in terms of anti-malware engines, it should be appreciated that other embodiments may be implemented as well. In particular, embodiments may be implemented where multiple applications with similar functionality or near redundant functionality are installed on a system. For example, embodiments may be directed to anti-malware, anti-spam, URL filters etc. Other types of examples exist as well. For example, embodiments may be implemented on systems that have access to multiple web browsers. One browser may be less safe to run at a given time than some other browser. Data can be downloaded about browser threat landscape along with browsers effectiveness in overcoming threats or being less vulnerable to threats. When a user requests a browser, the browser with least threat could be opened. Although not specifically enumerated here, embodiments could apply to other applications as well.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
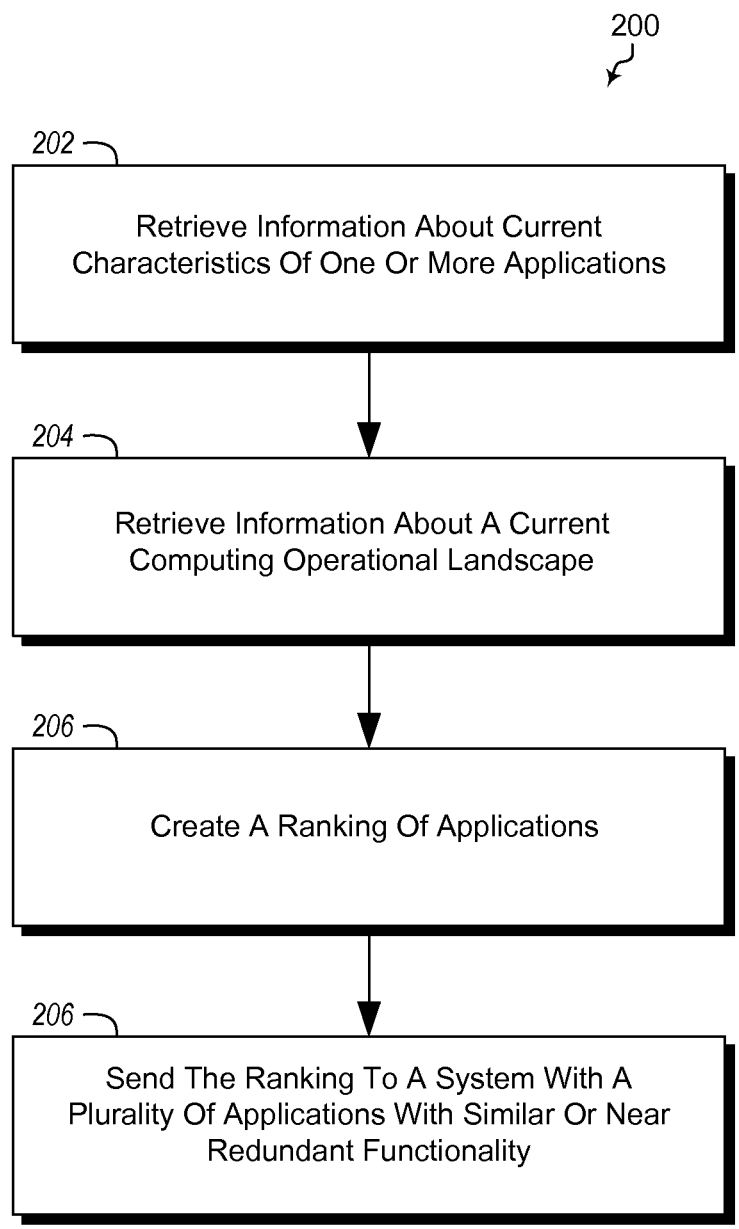
FIG. 2 illustrates a method of selecting applications to activate from among a plurality of applications with similar or near redundant functionality.

Referring now to FIG. 2, a method 200 is illustrated. The method 200 may be practiced in a computing environment including a system with a plurality of applications with similar or near redundant functionality. The method includes acts for selecting one or more applications from the plurality of applications to activate. The method 200 includes retrieving information about current characteristics of one or more applications (act 202). For example, in the case of anti-malware engines, the method 200 may include retrieving information about an engines ability to detect and deal with certain malware.

The method 200 includes retrieving information about a current computing operational landscape (act 204). For example, in the case of anti-malware engines, the method 200 may include retrieving information about current malware attacks or effectiveness.

Based on the information about current characteristics of one or more applications and the information about a current computing operational landscape, the method 200 includes creating a ranking of applications (act 206). For example, in the case where the applications are anti-malware applications, embodiments may rank engines based on the capabilities and effectiveness against certain malware in view of malware attacks that are presently prevalent.

The method 200 includes sending (or otherwise making available) the ranking to a system with a plurality of applications with similar or near redundant functionality (act 208). Sending, as defined herein, may include the data being pulled from the system. Thus, sending includes data transfer initiated either by a system providing the rankings automatically sending the rankings without a request from a system with a plurality of applications with similar or near redundant functionality, or by a system with a plurality of applications with similar or near redundant functionality requesting the ranking, etc. At the system one or more of the applications in the plurality of applications are selected to activate based on the ranking of application. Thus for example, the ranking may be sent to a system having available a plurality of anti-malware engines. One or more anti-malware engines may be selected from among the plurality of anti-malware engines based on the ranking provided.

The method 200 may be practiced, as illustrated above, where the applications with similar or near redundant functionality comprise anti-malware engines, and the current computing operation landscape comprises malware threat information.

In an alternative embodiment, the method 200 may be practiced where the applications with similar or near redundant functionality comprise anti-spam applications, and the current computing operation landscape comprises current spam information. For example information may be provided as to one or more of senders, domains of senders, content, subject matter, or other information related to current spam attacks.

The method 200 may be practiced where the applications with similar or near redundant functionality client side URL filtering applications, and the current computing operation landscape comprises current URL information. For example, such information may include category information (e.g. porn, gambling, shopping, social networking, streaming video, etc.). Such information may include information identifying categories that are harder or easier to filter.

The method 200 may be practiced where the applications with similar or near redundant functionality comprise web browser applications, and the current computing operation landscape comprises browser vulnerability information. For example, if a browser includes a vulnerability and attacks against that vulnerability are present, embodiments can provide information indicating that such attacks are prevalent.

The method 200 may further include packaging the ranking into an update for an antimalware product. In some of these embodiments, sending the ranking to a system with a plurality of applications with similar or near redundant functionality may include sending the update (including the update being pulled) as an update for the antimalware product at the system with a plurality of applications with similar or near redundant functionality.

Figure 3:
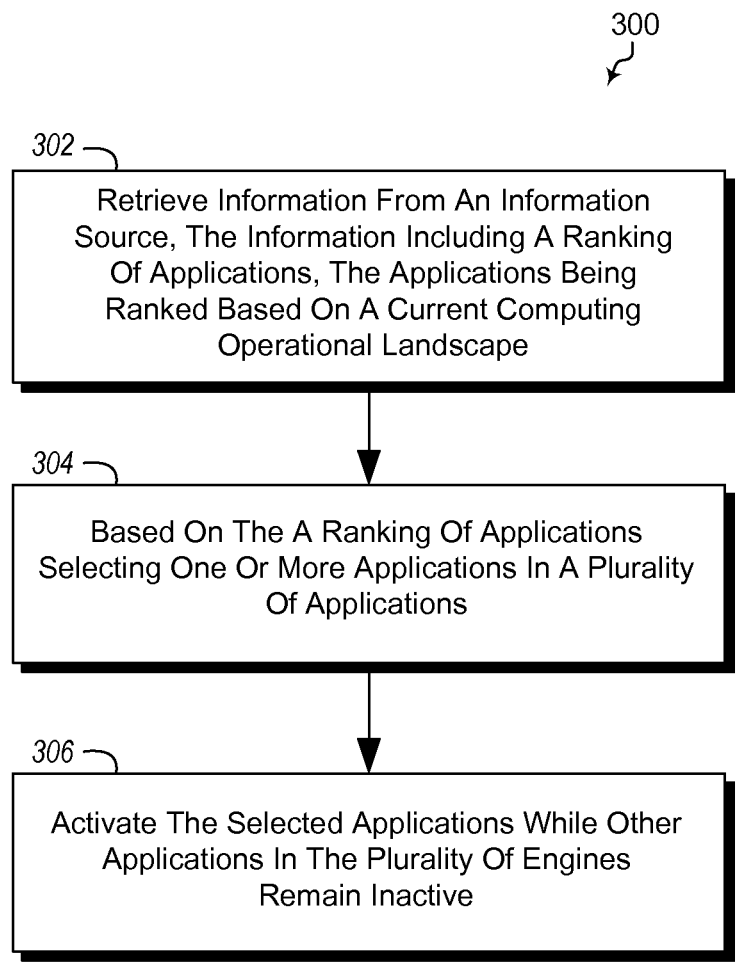
FIG. 3 illustrates another method of selecting applications to activate from among a plurality of applications with similar or near redundant functionality.

Referring now to FIG. 3, a method 300 is illustrated. The method 300 may be practiced in a computing environment including a system with a plurality of applications with similar or near redundant functionality. The method includes acts for selecting one or more applications from the plurality of applications to activate. While the method illustrated in FIG. 2 illustrates creation and sending of ranking information, the method 300 illustrates a method directed to receiving and using ranking information. The method 300 includes, at a system with a plurality of applications with similar or near redundant functionality, retrieving information from an information source (act 302). The information includes a ranking of applications. The applications are ranked based on a current computing operational landscape.

Based on the ranking of applications, the method 300 includes selecting one or more applications in the plurality of applications (act 304).

The method 300 includes activating the selected applications while other applications in the plurality of engines remain inactive (act 306).

Figure 4:
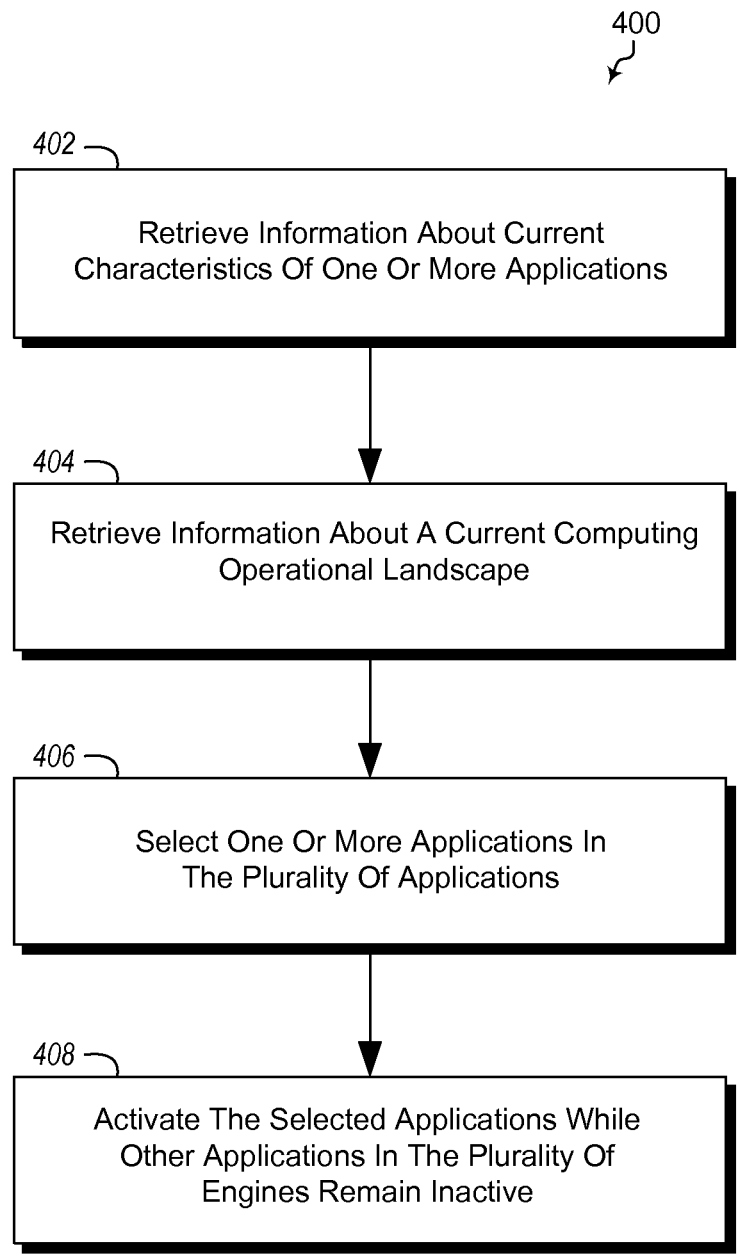
FIG. 4 illustrates another method of selecting applications to activate from among a plurality of applications with similar or near redundant functionality.

Referring now to FIG. 4, a method 400 is illustrated. The method 400 may be practiced in a computing environment including a system with a plurality of applications with similar or near redundant functionality. The method includes acts for selecting one or more applications from the plurality of applications to activate. The method 400 includes retrieving information about current characteristics of one or more applications (act 402).

The method 400 includes retrieving information about a current computing operational landscape (act 404).

Based on the information about current characteristics of one or more applications and the information about a current computing operational landscape, the method 400 includes selecting one or more applications in the plurality of applications (act 406).

The method 400 includes activating the selected applications while other applications in the plurality of engines remain inactive (act 408).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A physical computer readable storage medium comprising computer executable instructions that are executable by one or more processors cause the following to be performed:
   an information coordinator system receiving information about current characteristics of one or more applications;
   receiving information from a user system indicating what applications are available at the user system;
   retrieving information about a current computing operational effectiveness landscape, the information about current computing operation effective landscape comprising information about particular malware threats or spam outbreaks existing at a given time;
   based on the information about current characteristics of one or more applications, information indicating what applications are available at the user system and the information about a current computing operational landscape, creating a ranking of applications; and
   sending, or otherwise making available, the ranking to the user system, the user system having a plurality of applications with similar functionality available on the user system, in that the plurality of applications are stored at the user system, whereafter, at the user system one or more of the applications in the plurality of applications available on the system are selected to activate based on the ranking of applications with respect to the current computing operational landscape while one or more of the other applications in the plurality of applications are changed to a dormant state at the system based on the system determining which applications should be active on the system based on the ranking of applications.

2. The physical computer readable storage medium of claim 1, wherein the applications with similar functionality comprise anti-malware engines, and the current computing operation landscape comprises malware threat information.

3. The physical computer readable storage medium of claim 1, wherein the applications with similar functionality comprise a plurality of different web browser applications, and the current computing operation landscape comprises browser vulnerability information identifying that at least one of the web browser applications is less safe to run at a given time than another one of the web browser applications, further comprising the user system activating a web browser application with the least threats in view of the current computing operation landscape.

4. The physical computer readable storage medium of claim 1, further comprising computer executable instructions that when executed by one or more processor cause packaging the ranking into an update for an antimalware product, and wherein sending, or otherwise making available, the ranking to a system with a plurality of applications with similar functionality comprises sending the update as an update for the antimalware product at the system with a plurality of applications with similar functionality.

5. A physical computer readable storage medium comprising computer executable instructions that are executable by one or more processors of a user system cause the following to be performed:
the user system sending information indicating what applications are available at the user system;
the user system with a plurality of applications with similar functionality available on the system, in that the plurality of applications are stored at the system, retrieving information from an information source, the information including a ranking of applications, the applications being ranked based on a current computing operational landscape, the current computing operation effective landscape comprising information about particular malware threats or spam outbreaks existing at a given time and the information indicating what applications that are available at the user system;
the user system, based on the ranking of applications with respect to the current computing operational landscape and information indicating what applications that are available at the user system, selecting one or more applications in the plurality of applications to activate; and
the user system activating the selected applications while other applications in the plurality of applications are caused to become inactive at the system based on selecting one or more applications in the plurality of applications to activate.

6. The physical computer readable storage medium of claim 5, wherein the applications with similar functionality comprise anti-malware engines, and the current computing operation landscape comprises malware threat information.

7. The physical computer readable storage medium of claim 5, wherein the applications with similar functionality comprise anti-spam applications, and the current computing operation landscape comprises current spam information.

8. The physical computer readable storage medium of claim 5, wherein the applications with similar functionality comprise client side URL filtering applications, and the current computing operation landscape comprises current URL information.

9. The physical computer readable storage medium of claim 5, wherein the applications with similar functionality comprise a plurality of different web browser applications, and the current computing operation landscape comprises browser vulnerability information identifying that at least one of the web browser applications is less safe to run at a given time than another one of the web browser applications, further comprising computer executable instructions that when executed by one or more processor cause the system to activate a web browser application with the least threats in view of the current computing operation landscape.

10. The physical computer readable storage medium of claim 5, further wherein the ranking is packaged into an update for an antimalware product, and wherein retrieving information from an information source comprises receiving the update as an update for the antimalware product at the system with a plurality of applications with similar functionality.

11. The physical computer readable storage medium of claim 5, further comprising computer executable instructions that when executed by one or more processor cause displaying a single common user interface irrespective of what applications are selected and activated, such that reporting actions to the user are performed through the single common interface such that from a user perspective, it appears that only a single anti-malware product is in use.

12. The physical computer readable storage medium of claim 5, further comprising computer executable instructions that when executed by one or more processor cause implementing a single quarantine for a plurality of different anti-malware engines at the system, such that the plurality of different anti-malware engines at the system use the same quarantine.

13. In a computing environment, a user system comprising:
a plurality of applications with similar functionality;
at least one physical processor;
one or more computer readable media coupled to the at least one physical processor, the one or more computer readable media comprising computer executable instructions that are executable by the at least one physical processor to cause the user system to perform the following:
the user system sending information indicating what applications are available at the user system;
the user system with a plurality of applications with similar functionality available on the system, in that the plurality of applications are stored at the system, retrieving information from an information source, the information including a ranking of applications, the applications being ranked based on a current computing operational landscape, the current computing operation effective landscape comprising information about particular malware threats or spam outbreaks existing at a given time and the information indicating what applications that are available at the user system;
the user system, based on the ranking of applications with respect to the current computing operational landscape and information indicating what applications that are available at the user system, selecting one or more applications in the plurality of applications to activate; and
the user system activating the selected applications while other applications in the plurality of applications are caused to become inactive at the user system based on the selecting of the one or more applications in the plurality of applications.

14. The user system of claim 13, wherein the applications with similar functionality comprise anti-malware engines, and the current computing operation landscape comprises malware threat information.

15. The user system of claim 13, wherein the applications with similar functionality comprise anti-spam applications, and the current computing operation landscape comprises current spam information.

16. The user system of claim 13, wherein the applications with similar functionality comprise client side URL filtering applications, and the current computing operation landscape comprises current URL information.

17. The user system of claim 13, wherein the applications with similar functionality comprise a plurality of different web browser applications, and the current computing operation landscape comprises browser vulnerability information identifying that at least one of the web browser applications is less safe to run at a given time than another one of the web browser applications, wherein the one or more computer readable media further comprise computer executable instructions that when executed by the at least one processor cause the system to activate a web browser application with the least threats in view of the current computing operation landscape.

18. The user system of claim 13, further wherein the ranking is packaged into an update for an antimalware product, and wherein retrieving information from an information source comprises receiving the update as an update for the antimalware product at the system with a plurality of applications with similar functionality.

19. The user system of claim 13, wherein the one or more computer readable media further comprise computer executable instructions that when executed by the at least one processor cause displaying a single common user interface irrespective of what applications are selected and activated, such that reporting actions to the user are performed through the single common interface such that from a user perspective, it appears that only a single anti-malware product is in use.

20. The user system of claim 13, wherein the one or more computer readable media further comprise computer executable instructions that when executed by the at least one processor cause implementing a single quarantine for a plurality of different anti-malware engines at the system, such that the plurality of different anti-malware engines at the system use the same quarantine.

* * * * *